United States Patent
Bell

(10) Patent No.: US 11,123,695 B2
(45) Date of Patent: Sep. 21, 2021

(54) CONTAINER FOR HYDROGEN PEROXIDE SOLUTIONS

(71) Applicant: American Sterilizer Company, Mentor, OH (US)

(72) Inventor: Jonathan Richard Bell, Mentor, OH (US)

(73) Assignee: American Sterilizer Company, Mentor, OH (US)

( * ) Notice: Subject to any disclaimer, the term of this patent is extended or adjusted under 35 U.S.C. 154(b) by 20 days.

(21) Appl. No.: 15/651,200

(22) Filed: Jul. 17, 2017

(65) Prior Publication Data
US 2019/0015795 A1  Jan. 17, 2019

(51) Int. Cl.
| A61J 1/10 | (2006.01) |
| B01D 71/06 | (2006.01) |
| A61J 1/05 | (2006.01) |
| B01D 53/22 | (2006.01) |
| B01D 69/02 | (2006.01) |
| A61J 1/14 | (2006.01) |

(52) U.S. Cl.
CPC ............... *B01D 71/06* (2013.01); *A61J 1/05* (2013.01); *A61J 1/10* (2013.01); *A61J 1/1468* (2015.05); *B01D 53/22* (2013.01); *B01D 69/02* (2013.01)

(58) Field of Classification Search
CPC .. A61J 1/1468; A61J 1/205; A61J 1/10; A61J 1/05
USPC ........................................................ 206/524.1
See application file for complete search history.

(56) References Cited

U.S. PATENT DOCUMENTS

| 3,696,958 A | 10/1972 | Lee |
| 4,596,573 A | 6/1986 | Donnan et al. |
| 4,654,240 A | 3/1987 | Johnston |
| 5,023,119 A | 6/1991 | Yamakoshi |
| 5,037,623 A | 8/1991 | Schneider et al. |
| 5,054,632 A * | 10/1991 | Alberghini ........... B65D 1/0223 215/381 |
| 5,232,095 A | 8/1993 | Childers et al. |
| 5,287,986 A | 2/1994 | Frost |
| 5,364,384 A | 11/1994 | Grabenkort et al. |

(Continued)

FOREIGN PATENT DOCUMENTS

| EP | 0229184 | 7/1987 |
| EP | 2737890 | 6/2014 |
| JP | 2004217768 | 8/2004 |

OTHER PUBLICATIONS

Machine English translation of specification of JP 2004217768. (Year: 2004).*

(Continued)

*Primary Examiner* — Steven A. Reynolds
(74) *Attorney, Agent, or Firm* — Renner, Otto, Boisselle & Sklar, LLP

(57) ABSTRACT

This invention relates to a container for storing an aqueous hydrogen peroxide solution, the container comprising: walls formed from a gas permeable, liquid impermeable polymeric material, the walls being capable of permitting gas to escape from the container through the walls to avoid build-up of pressure within the container while retaining liquid within the container, the polymeric material having a gas transmission rate in the range from about 0.05 to about 0.5 cubic centimeters of gas per square centimeter of polymeric material per 24 hours at 25° C.

7 Claims, 1 Drawing Sheet

(56) References Cited

U.S. PATENT DOCUMENTS

| | | | |
|---|---|---|---|
| 5,405,333 | A | 4/1995 | Richmond |
| 5,686,527 | A | 11/1997 | Laurin et al. |
| 5,942,408 | A | 8/1999 | Christensen et al. |
| 6,297,046 | B1 | 10/2001 | Smith et al. |
| 7,717,897 | B2 | 5/2010 | Burg et al. |
| 8,075,544 | B2 | 12/2011 | Peluso et al. |
| 2003/0080140 | A1 | 5/2003 | Neas et al. |
| 2004/0078024 | A1 | 4/2004 | Peluso et al. |
| 2013/0216749 | A1 | 8/2013 | Aiba |
| 2013/0243884 | A1* | 9/2013 | Talamonti ............ A01N 25/34 424/616 |
| 2016/0174553 | A1* | 6/2016 | Matta .................. A01N 37/16 424/126 |

OTHER PUBLICATIONS

Anonymous: "Material Compatibility with Hydrogen Peroxide"; Mar. 18, 2017; XP055495827; Retrieved from the Internet: URL:http://www.ozoneservices.com/articles/; retrieved on Jul. 27, 2018; pp. 1-2.

Dupont Teijin: "Product Information Chemical Properties Table 1 Chemical Resistance of Mylar Tensile Tensile Stress at Tear Pneumatic Strength Elongation"; Jul. 23, 2015; pp. 1-4; XP055495818; retrieved from the Internet: URL: http://usa.dupontteijinfilms.com/wp-content/uploads/2017/01/MylarChemicalProperties.pdf; retrieved on Jul. 27, 2018; figure.

Internal Search Report and Written Opinion of the International Searching Authority; International Application No. PCT/US2018/036030; dated Aug. 8, 2018.

Hydrogen Peroxide Poly Plastic Storage Tanks—Poly Processing; www.polyprocessing.com/chemical-storage/hydrogen-peroxide; printed Feb. 10, 2017; three pages.

Renolit Medical—Solmed applications; www.renolit.com/medical/en/products; printed Feb. 10, 2017; three pages.

The Cary Company; product information for 16 oz. Brown Peroxide Modern Round Barrier Resin Bottle; www.thecarycompany.com, eight pages, printed Feb. 10, 2017.

Steris; product information—Vaprox Hydrogen peroxide Sterilant; www.steris.com, one page, printed Feb. 7, 2017.

Schumb; "Stabilization of Concentrated Solutions of Hydrogen Peroxide"; Industrial and Engineering Chemistry; vol. 49, No. 10, Oct. 1957, pp. 1759-1562.

Permeability of Polymrs; Polymer Properties Database; "Barrier Properties of Polymers"; http://polymerdatabase.com, three pages, printed Jul. 5, 2017.

Zeman et al.; Permeability of Polymeric Packaging Materials; Technical Sciences; Abbrev.: Techn. Sc., No. 10, Y 2007, pp. 26-34.

Innternational Preliminary Report on Patentability for corresponding PCT International Application PCT/US2018/036030 dated Oct. 8, 2019.

* cited by examiner

CONTAINER FOR HYDROGEN PEROXIDE SOLUTIONS

TECHNICAL FIELD

This invention relates to a container for hydrogen peroxide solutions.

BACKGROUND

Aqueous hydrogen peroxide solutions have many uses, including those as disinfectants and sterilants as well as for use with cosmetics, alternative medicines, and the like.

SUMMARY OF THE INVENTION

This invention relates to a container for storing an aqueous hydrogen peroxide solution, the container comprising: walls formed from a gas permeable, liquid impermeable polymeric material, the walls being capable of permitting gas to escape from the container through the walls to avoid build-up of pressure within the container while retaining liquid within the container, the polymeric material having a gas transmission rate in the range from about 0.05 to about 0.5 cubic centimeters ($cm^3$) of gas per square centimeter of ($cm^2$) polymeric material per 24 hours at 25° C., or from about 0.1 to about 0.4 $cm^3/cm^2$ per 24 hours at 25° C., or from about 0.1 to about 0.3 $cm^3/cm^2$ per 24 hours at 25° C., or from about 0.18 to about 0.26 $cm^3/cm^2$ per 24 hours at 25° C., or about 0.22 $cm^3/cm^2$ per 24 hours at 25° C. The polymeric material may comprise a polymeric film material. The walls may comprise a mono-layered or multi-layered polymeric (e.g., polymeric film) material.

A problem in the art relating to containers for aqueous hydrogen peroxide solutions is that hydrogen peroxide solutions are thermodynamically unstable and decompose to form water and oxygen gas. The release of oxygen gas presents problems for storage and transportation of aqueous hydrogen peroxide solutions, as the released gas needs to be vented to avoid pressurizing and potentially rupturing the storage and shipping containers. Conventional vented containers make use of a hydrophobic membrane, typically installed in the lid of the container, which is permeable to the evolved oxygen, but which, due to its hydrophobicity, prevents any liquid from passing through the membrane (i.e., ensuring the container maintains containment of the liquid). Maintaining this containment is important since concentrated solutions of hydrogen peroxide are chemically reactive and leaks can cause damage to materials and injuries to personnel handling the containers.

A problem with containers employing hydrophobic membranes as vents is that if the container is placed on its side such that the liquid inside covers the membrane, the gases can no longer vent and pressure builds up inside the container. The pressure can build up to a point where it can force the liquid solution through the membrane and cause a leak with the associated risks of material damage and potential for injury.

A number of approaches have been developed to prevent the vent membrane from becoming covered by the solution in the container (e.g., U.S. Pat. No. 5,037,623). Another approach provides a mechanism of preventing the container from being inverted or placed on its side (e.g., U.S. Pat. No. 5,232,095). Both of these approaches result in packaging that occupies significantly larger volumes than the liquid being transported (i.e., volumetrically inefficient). The capsules described in U.S. Pat. No. 5,037,623 require that the volume of liquid placed in the container be less than 50% of the total volume of the container (i.e., more air is shipped than product). The rotating inner box concept of U.S. Pat. No. 5,232,095 requires that the outer box be sized to allow sufficient room for the inner box to rotate freely, which leads to even more unutilized packaging.

This invention provides a solution to the problems associated with storing and transporting hydrogen peroxide solutions. With this invention, evolved gas is released through walls of the container and, consequently, there is no need to include a vent in the container. Also, there is no need to ensure that the container remains upright. The container provided with this invention is volumetrically efficient, i.e., the requirement for providing an internal volume for the container that is significantly larger than the volume of liquid to be stored or transported has been eliminated. As such, the internal volume of the container may be no more than about 25%, or no more than about 15%, or no more than about 10%, or no more than about 5% or no more than about 2%, or no more than about 1% more than the volume of aqueous hydrogen peroxide solution to be stored in the container.

DETAILED DESCRIPTION

Figure 1:
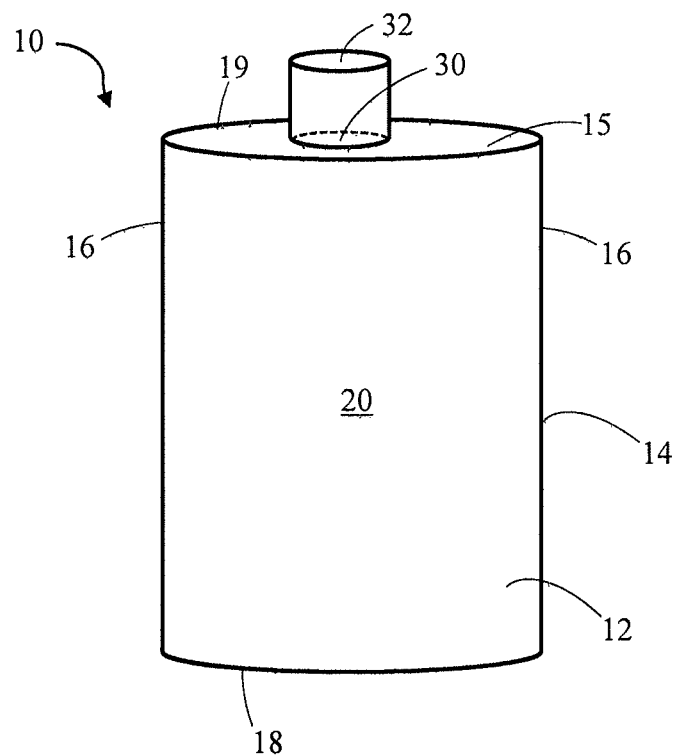
FIG. 1 is a schematic illustration of a container for storing an aqueous hydrogen peroxide solution within the scope of the invention.

All ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

The word "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," may refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The transitional words or phrases, such as "comprising," "including," "carrying," "having," "containing," "involving," "holding," and the like, are to be understood to be open-ended, i.e., to mean including but not limited to.

The term "gas permeable, liquid impermeable" is used herein to refer to a polymeric material (e.g., a polymeric film material) that is impermeable to the flow of liquid through the polymeric material, but will allow a gas to pass through the polymeric material at a rate in the range from about 0.05 to about 0.5 cubic centimeters ($cm^3$) of gas per square centimeter ($cm^2$) of polymeric material per 24 hours at 25° C., or from about 0.1 to about 0.4 $cm^3/cm^2$ per 24 hours at 25° C., or from about 0.1 to about 0.3 $cm^3/cm^2$ per 24 hours at 25° C., or from about 0.18 to about 0.26 $cm^3/cm^2$ per 24 hours at 25° C., or about 0.22 $cm^3/cm^2$ per 24 hours at 25° C. The term "gas impermeable, liquid impermeable" is used herein to refer to a material that is both gas and liquid impermeable, and is not "gas permeable, liquid impermeable," as defined above.

The inventive container for storing an aqueous hydrogen peroxide solution may comprise walls formed from the gas permeable, liquid impermeable polymeric material. The polymeric material may comprise a film material. The walls may be mono-layered or multi-layered. The walls may comprise from 1 to about 4 layers, or 1 to about 3 layers, or 1 to about 2 layers, or one layer, of polymeric (e.g., polymeric film) material. The polymeric (e.g., polymeric film) material may be formed using an extrusion, co-extrusion or lamination process. The container may comprise two or more walls formed together along opposing edges to define a fluid reservoir. The walls may be joined to each other using conventional procedures, including thermoforming or using an adhesive. The walls may be joined together by applying heat and pressure to form weld seals along the side edges of the walls. The container may comprise more than two walls, for example, from 2 to about 6, or 2 to about 5, or 2 to about 4, or 2 to 3 walls. The container may be formed using a molding process. The container may comprise a cylindrical construction. The cylindrical construction may include circular ends.

In an embodiment, at least about 50% of the surface area of the walls of the container may be formed from the gas permeable, liquid impermeable polymeric material, or at least about 70%, or at least about 90%, or at least about 95%, or at least about 99% of the surface area of the walls of the container may be formed from the gas permeable, liquid impermeable polymeric material. In an embodiment, the entire surface area (or about 100% of the surface area) of the walls of the container may be formed from the gas permeable, liquid impermeable polymeric material.

In an embodiment, from about 50% to about 99% of the surface area of the walls of the container may be formed from the gas permeable, liquid impermeable polymeric material, or from about 70% to about 99%, or from about 90% to about 99%, or from about 95% to about 99% of the surface area of the walls of the container may be formed from the gas permeable, liquid impermeable material.

In an embodiment, from about 50% to about 95% of the surface area of the walls of the container may be formed from the gas permeable, liquid impermeable polymeric material, or from about 70% to about 95%, or from about 90% to about 95% of the surface area of the walls of the container may be formed from the gas permeable, liquid impermeable polymeric material.

In an embodiment, the container may be characterized by the absence of a vent for allowing passage of gas out of the container. The container may be in the form of a bag, pouch or bottle. The container may comprise an intravenous (IV) bag.

The gas permeable, liquid impermeable polymeric material may comprise a polyolefin, polyester, polyamide, vinyl chloride polymer, polyacrylate, polycarbonate, or a mixture of two or more thereof. The polymeric material may comprise a polyethylene, polypropylene, polyethylene terephthalate, copolymers of polyethylene terephthalate, polybutylene terephthalate, polyvinyl chloride, polyvinylidene fluoride, ethylene vinyl alcohol, ethylene vinyl acetate, polychoroprene, polyisoprene, polytetrafluoroethylene, poly (trifluorochloroethylene), poly methacrylate, poly (meth) methacrylate, or a mixture of two or more thereof. The polymeric material may comprise a vinyl film.

The gas permeable, liquid impermeable polymeric material may be characterized by a gas transmission rate in the range from about 0.05 to about 0.5, or from about 0.1 to about 0.4, or from about 0.1 to about 0.3, or from about 0.18 to about 0.26, or about 0.22 cubic centimeters of gas per square centimeter of polymeric material per 24 hours at 25° C. The polymeric material may comprise a vinyl film wherein the gas transmission rate may be in the range from about 0.05 to about 0.5, or from about 0.1 to about 0.4, or from about 0.1 to about 0.3, or from about 0.18 to about 0.26, or about 0.22 cubic centimeters of gas per square centimeter of film material per 24 hours at 25° C.

The container may have one or more openings to allow an aqueous hydrogen peroxide solution to be added to the container or to be removed from the container. The one or more openings may include caps which can be removed.

The walls of the container may be mono-layered or multi-layered and may have a thickness in the range of about 25 to about 250 µm, or from about 35 to about 230 µm, or from about 45 to about 220 µm, or about 50 to about 210 µm, or about 51 µm to about 203.2 µm. The container may have an internal volume in the range from about 0.05 to about 30 liters, or from about 0.05 to about 20 liters, or from about 0.05 to about 10 liters, or from about 0.05 to about 5 liters, or from about 0.05 to about 1 liter, or from about 0.05 to about 0.5 liter, or from about 0.05 to about 0.3 liters, or from about 0.5 to about 30 liters, or from about 0.5 to about 20 liters, or from about 0.5 to about 10 liters, or from about 0.5 to about 5 liters, or from about 0.5 to about 3 liters, or from about 0.5 to about 2 liters, or from about 0.5 to about 1 liter.

The aqueous hydrogen peroxide solution that may be stored or shipped in the container may have a concentration of hydrogen peroxide in the range from about 3% by about 70% by weight, or from about 3% by about 6% by weight, or from about 10% by about 70% by weight, or from about 30% by about 40% by weight, or about 35% by weight, or from about 55% to about 65% by weight, or about 59% by weight.

An example of a container within the scope of the invention is illustrated in FIG. 1. Referring to FIG. 1, container 10 includes a first wall 12, a second wall 14, and an end section 15. The walls 12 and 14 may be joined to each other along opposing edges 16 and 18 to define fluid reservoir 20 for containing the aqueous hydrogen peroxide solution. The fluid reservoir 20 may have a volume in the range from about 0.05 to about 30 liters, or from about 0.05 to about 20 liters, or from about 0.05 to about 10 liters, or from about 0.05 to about 5 liters, or from about 0.05 to about 2 liters, or from about 0.05 to about 1 liter, or from about 0.05 to about 0.5 liter or from about 0.05 to about 0.3 liters. End section 15 may be joined to walls 12 and 14 along edge 19. The walls 12 and 14 may be formed from the gas permeable, liquid impermeable polymeric material. The walls 12 and 14 may comprise a mono-layered or multi-layered polymeric (e.g., polymeric film) material. The end section 15 may be formed from a gas permeable, liquid impermeable polymeric material, or from a gas impermeable, liquid impermeable polymeric material. The edges may be joined to each other using any conventional technique, including thermoforming, adhesives, and the like. The edges may be joined to each other by applying heat and pressure to form weld seals along the edges of the walls. Alternatively, the container 10 may be formed using a continuous polymeric material whereby the walls 12 and 14 are formed from a single sheet of polymeric material. With such a construction, the edges 16 do not need to be joined to one another since they along with the walls 12 and 14 may be formed from a single sheet of polymeric material. The walls 12 and 14 may have the dimensions of about 34 cm by about 34 cm, or about 144 cm by about 144 cm. The surface area of each of the walls 12 and 14 may be in the range from about 100 to about 30,000 cm$^2$, or from about 300 to about 25000 cm$^2$. The container 10 may include an opening 30 that allows the aqueous hydrogen peroxide solution to be added to the fluid reservoir 20 or to be removed from the reservoir. The opening 30 may include cap 32. The cap 32 may be threaded. The cap 32 may be secured with an adhesive to prevent leakage during transport and storage of the container 10.

Figure 2:
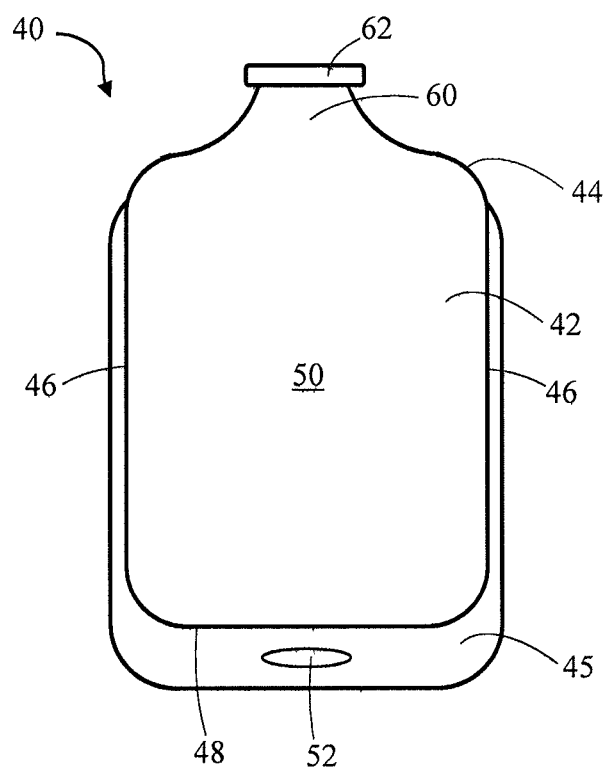
FIG. 2 is a schematic illustration of an IV bag within the scope of the invention.

In an embodiment, the container may be in the form of an IV bag. This is shown in FIG. 2. Referring to FIG. 2, IV bag 40 includes a first wall 42, a second wall 44, and a tab section 45. The walls 42 and 44 may be joined to each other along opposing edges 46 and 48 to define fluid reservoir 50 for containing the aqueous hydrogen peroxide solution. The fluid reservoir 50 may have a volume in the range from about 0.05 to about 30 liters, or from about 0.05 to about 20 liters, or from about 0.05 to about 10 liters, or from about 0.05 to about 5 liters, or from about 0.05 to about 2 liters, or from about 0.05 to about 1 liter, or from about 0.05 to about 0.5 liter, or from about 0.05 to about 0.3 liters. Tab section 45 may be joined to walls 42 and 44 along at least one of opposing edges 46 and 48. Tab section 45 may extend away from fluid reservoir 50 and define a hole 52 to enable hanging. The walls 42 and 44 may be formed from the gas permeable, liquid impermeable polymeric material. The walls 42 and 44 may comprise a mono-layered or multi-layered polymeric (e.g., polymeric film) material. The tab section 45 may be formed from a gas permeable, liquid impermeable polymeric material, or from a gas impermeable, liquid impermeable polymeric material. The edges may be joined to each other using any conventional technique, including thermoforming, adhesives, and the like. The edges may be joined to each other by applying heat and pressure to form weld seals along the edges of the walls. Alternatively, the IV bag 40 may be formed using a continuous polymeric material whereby the walls 42 and 44 are formed from a single sheet of polymeric material. With such a construction, the edges 46 do not need to be joined to one another since they along with the walls 42 and 44 may be formed from a single sheet of polymeric material. The walls 42 and 44 may have the dimensions of about 34 cm by about 34 cm, or about 144 cm by about 144 cm. The surface area of each of the walls 42 and 44 may be in the range from about 100 to about 30,000 cm$^2$, or from about 300 to about 25000 cm$^2$. The IV bag 40 may include an opening 60 that allows the aqueous hydrogen peroxide solution to be added to the fluid reservoir 50 or to be removed from the reservoir. The opening 60 may include cap 62. The cap 62 may be threaded. The cap 62 may be secured with an adhesive to prevent leakage during transport and storage of the IV bag 40.

EXAMPLE

An IV bag is formed from two sheets of a 10 cm×20 cm Renolit EH222 flexible vinyl film. The Renolit EH222 vinyl film is available from The Renolit Group. The bag contains 200 g of a 35% by weight aqueous hydrogen peroxide solution. Renolit EH222 flexible vinyl film has a gas transmission rate of 0.22 cubic centimeters (cm$^3$) of gas per square centimeter (cm$^2$) of film material per 24 hours at 25° C.

The concentration of the hydrogen peroxide solution in the IV bag decreases by 0.005% by weight per hour. In one hour, the concentration of the 35% by weight hydrogen peroxide solution drops to 34.995% (i.e., mass concentration drops from 350 g/kg to 349.95 g/kg). The mass of the decomposed hydrogen peroxide is 0.05 g/kg (=350 g/kg-349.95 g/kg). For the 200 g of hydrogen peroxide solution, 0.01 g (=0.05 g/kg×0.2 kg) or 3×10$^{-4}$ moles (=0.01 g/34 g/mol) of hydrogen peroxide is decomposed. The molar amount of hydrogen peroxide decomposed (i.e., 3×10$^{-4}$ moles) releases half that number of moles of oxygen (1.5× 10$^{-4}$) also the number of moles of oxygen gas produced.

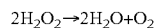

$$2H_2O_2 \rightarrow 2H_2O + O_2$$

The volume of oxygen gas produced is calculated using the formula:

$$V = nRT/P$$

where V is the volume in m$^3$;
n is the number of gram moles;
R is the Ideal gas constant=8.314 J/Mol·K;
T is the temperature in Kelvin; and
P=pressure=101325 Pascals (i.e. 1 atmosphere).
Using this formula, the oxygen generation rate is calculated to be 0.05 cubic centimeter of oxygen (=1.5×10$^{-4}$ moles× 8.314 J/Mol·K×298K/101325 Pascals). The total surface area of the IV bag is 400 cm$^2$ (=2×10 cm×20 cm). This corresponds to a gas permeability for the IV bag of 88 cubic centimeters per 24 hours at 25° C. ((0.22 cm$^3$/cm$^2$)×(400 cm$^2$)=88 cm$^3$).

This example demonstrates that this IV bag has a permeability to allow safe storage of a 35% by weight hydrogen peroxide solution without the need for a vent.

While the invention has been explained in relation to various embodiments, it is to be understood that various modifications thereof will become apparent to those skilled in the art upon reading the specification. Therefore, it is to be understood that the invention disclosed herein includes any such modifications that may fall within the scope of the appended claims.

What is claimed is:

1. A container for storing an aqueous hydrogen peroxide solution, the container comprising:
    a bag or a pouch with walls formed from a mono-layered, gas permeable, liquid impermeable polymeric film material, the walls having a thickness in the range of 25 to 250 microns and being capable of permitting gas to escape from the container through the walls to avoid build-up of pressure within the container while retaining liquid within the container, the walls having a gas transmission rate in the range from about 0.05 to about 0.5 cubic centimeters of gas per square centimeter of polymeric film material per 24 hours at 25° C., wherein the walls comprise two or more walls formed from the polymeric film material joined together along opposing edges to define a fluid reservoir;
    wherein the aqueous hydrogen peroxide solution is present in the container and consists essentially of hydrogen peroxide and water with a hydrogen peroxide concentration in the range from 30% to 70% by weight;
    wherein the container is characterized by the absence of a vent for allowing passage of gas out of the container; and
    wherein the internal volume of the container is no more than 10% more than the volume of the aqueous hydrogen peroxide solution in the container.

2. The container of claim 1, wherein the gas permeable, liquid impermeable polymeric material comprises a vinyl film.

3. The container of claim 1, wherein the walls have a thickness in the range from about 50 µm to about 210 µm.

4. The container of claim 1, wherein the gas permeable, liquid impermeable polymeric material comprises a vinyl film with a gas transmission rate in the range from about 0.1 to about 0.3 cubic centimeters of gas per square centimeter of film material per 24 hours at 25° C.

5. The container of claim 3 wherein the gas transmission rate is in the range from about 0.18 to about 0.26 cubic centimeters of gas per square centimeter of film material per 24 hours at 25° C.

6. The container of claim 1, wherein the container includes an opening for allowing the aqueous hydrogen peroxide solution to be added to the container or to be removed from the container.

7. The container of claim 1, wherein the container comprises an IV bag.

\* \* \* \* \*